United States Patent [19]

Underwood et al.

[11] Patent Number: 4,504,437

[45] Date of Patent: Mar. 12, 1985

[54] SEISMIC RESTRAINT MEANS FOR A NUCLEAR RADIATION DETECTOR MOUNTED IN A TUBULAR THIMBLE

[75] Inventors: Richard H. Underwood; William H. Todt, both of Elmira, N.Y.

[73] Assignee: Westinghouse Electric Corp., Pittsburgh, Pa.

[21] Appl. No.: 382,437

[22] Filed: May 26, 1982

[51] Int. Cl.³ .................... G01T 3/00; G21C 9/00
[52] U.S. Cl. .................... 376/153; 376/254; 376/285
[58] Field of Search ............ 376/285, 277, 153–155, 376/254, 255, 245, 302–304; 188/378, 380; 248/636; 267/137; 33/304; 15/104.05, 104.3, 104.09

[56] References Cited

U.S. PATENT DOCUMENTS

| | | | |
|---|---|---|---|
| 2,328,093 | 8/1943 | Osborn et al. | 15/104.3 R |
| 2,579,813 | 12/1951 | Frank | 15/104.05 X |
| 2,962,614 | 11/1960 | Weill | 376/153 |
| 3,129,836 | 4/1964 | Freuel | 376/285 X |
| 3,905,061 | 9/1975 | Cradeur | 15/104.05 X |

FOREIGN PATENT DOCUMENTS 107017  10/1924  Switzerland .................. 33/304

Primary Examiner—Richard E. Schafer
Assistant Examiner—John S. Maples
Attorney, Agent, or Firm—W. G. Sutcliff

[57] ABSTRACT

Seismic restraint means are provided for mounting an elongated, generally cylindrical nuclear radiation detector within a tubular thimble. The restraint means permits longitudinal movement of the restraint means and the radiation detector into and out of the thimble. The restraint means includes spring bias means and thimble constant means whereby the contact means engage the thimble with a constant predetermined force which minimizes seismic vibration action on the radiation detector.

3 Claims, 4 Drawing Figures

SEISMIC RESTRAINT MEANS FOR A NUCLEAR RADIATION DETECTOR MOUNTED IN A TUBULAR THIMBLE

BACKGROUND OF THE INVENTION

The present invention relates to mechanical seismic restraint means which are used in nuclear safety systems. In particular, the seismic restraint means of the present invention are usable with generally cylindrical nuclear radiation detectors which must be mechanically supported in a vertical position about a nuclear reactor vessel, and which detectors must be substantially isolated from vibrational force resulting from seismic activity.

The typical out-of-core radiation detector utilized in nuclear safety systems is an ion chamber of substantial length, for example about 6 to 12 feet long. The ion chamber typically utilizes concentric cylindrical electrodes which are maintained a fixed distance apart, with opposed electrical potentials for attracting respectively the opposed charge particles which are generated in the ion chamber by neutrons from the reactor core. Such ion chambers are thus used to monitor reactor activity and to indicate the operational status of the reactor. The ion chamber is typically mounted in an elongated tubular thimble which is typically open ended at the top and may be closed or open ended at the bottom. A plurality of such thimbles are spaced around the reactor vessel in a predetermined array to permit sampling of the neutron flux level in the vicinity of the reactor vessel. Seismic activity can produce significant vibrational forces on the elongated ion chambers and give rise to electrical noise in the output signal from such ion chambers. This electrical noise is thought to be a result of the vibratory motion of the electrodes relative to each other in the ion chamber.

The tubular thimbles within the ion chamber radiation detectors are typically mounted can have a variable inside diameter, as is typical for commercially available piping which is used in forming the reactor thimbles. A typical 6 inch nominal diameter schedule 80 piping typically will have an inside diameter which ranges from about 5.931 inch to 5.730 inch, and a 6 inch nominal diameter schedule 40 pipe has a resultant inside diameter range of from about 6.197 inch to 6.034 inch. With such inside diameter range variations of up to about 0.2 inch inside diameter, it is difficult to provide a detector support means which provides a uniform fit and support of the detector assembly for the wide range of thimble inside diameters. It has thus been necessary to provide a rather loose fit in current detector support assemblies relative to the thimble ID. This leads to excessive motion of the detector assembly during seismic activity and results in undesirable electrical signals generated by motion of the internal detector parts. The presently utilized detector support assemblies are also rigid assemblies and there is thus no damping of impact shocks experienced by the assembly during seismic activity.

It is the object of the present invention to provide a seismic restraint means which will provide a uniform fit for a detector assembly within a tubular thimble where the range of thimble inside diameters has significant variation. It is also desirable to provide a constant restraining force between the detector and the thimble with the seismic means capable of damping the vibrational modes which are induced during seismic activity.

SUMMARY OF THE INVENTION

Seismic restraint means are provided for mounting a generally cylindrical nuclear radiation detector within a tubular support thimble. The restraint means comprises a split clamp ring which is securely connectable about the generally cylindrical, elongated radiation detector. A plurality of symmetrically spaced support arms are pivotally mounted from and extend outwardly from the split clamp ring. Low friction thimble contact means are disposed at the extending end of each support arm. Spring bias means are coupled to each respective pivotally mounted support arm and serve to bias the arm outwardly so that the thimble contact means engage the thimble with a constant predetermined force which minimizes seismic vibration acting on the radiation detector.

DESCRIPTION OF THE PREFERRED EMBODIMENTS

Figure 1:
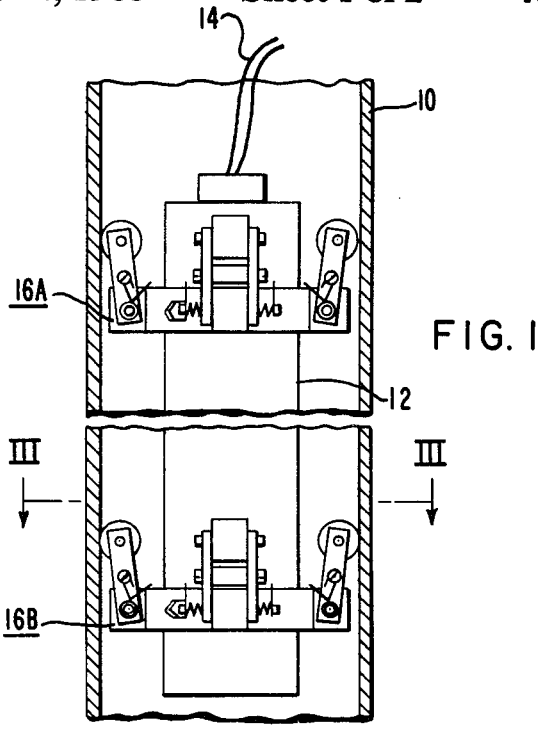
FIG. 1 is a side elevational view of an elongated radiation detector mounted by means of the seismic restraint means of the present invention within a tubular thimble.
Figure 3:
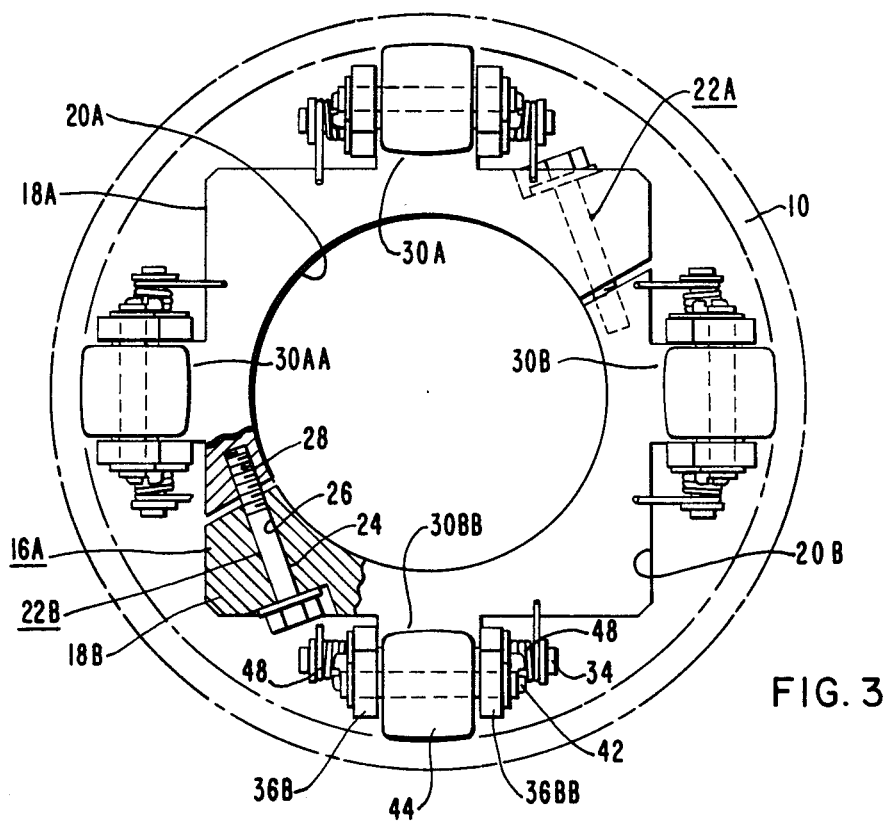
FIG. 3 is a view along the line III—III taken in FIG. 1 to illustrate a plan view of the seismic restraint means of the present invention.
Figure 2:
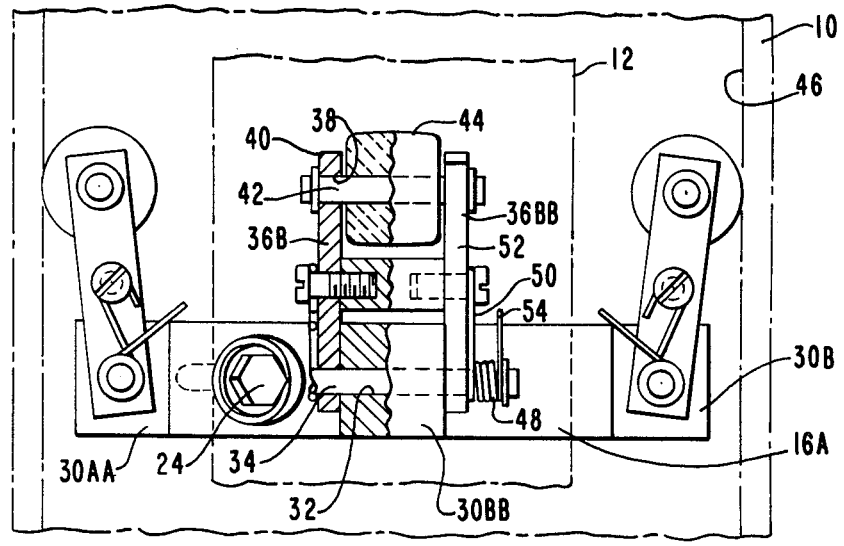
FIG. 2 is an enlarged elevational view partly in section of the one of the seismic restraint means of the present invention.

The invention can be best understood by reference to the embodiments seen in FIGS. 1 through 4. In FIG. 1 an elongated vertically disposed tubular thimble 10, is one of a plurality of such thimbles which are disposed about a nuclear reactor vessel within the containment building of the nuclear power plant. The thimble 10 is typically a 6 inch nominal diameter schedule 40 or schedule 80 pipe, which is open at the top end, and may be closed or open ended at the bottom of the thimble. An elongated generally cylindrical nuclear radiation detector 12 is mounted within the thimble 10 generally coaxially therewithin. The radiation detector 12 is typically of the ion chamber type which has an outside diameter of about 3 inches, and ranges from several feet to about 12 feet long. An electrical lead 14 extends from one end of the radiation detector 12 and extends to a remotely located control system which provides operating input potential, and output signal measuring means, which output signal is indicative of neutron flux passing through the detector.

A plurality of seismic restraint means 16A, 16B are longitudinally spaced along the length of the cylindrical radiation detector 12, and are securely connected thereto to provide a support means from thimble 10. The seismic restraint means 16A and 16B are identical in structure, and one such restraint means 16A is best seen in detail in FIGS. 2 and 3. The seismic restraint means 16A comprises a pair of split clamp ring portions 18A and 18B each with respective arcuate interior surfaces 20A and 20B having a radius of curvature slightly larger than the generally cylindrical radiation detector 12. The split clamp ring portions 18A and 18B are brought together about the detector 12, with opposed clamp fastening means 22A and 22B securely connecting the clamp ring portions 18A and 18B to the detector 12. The fastening means 22A and 22B each comprise a bolt 24 passing through an aperture 26 of one split clamp ring and engaging a threaded aperture 28 in the other split clamp ring. When the split clamp ring portions 18A and 18B are fastened together they define a generally square perimeter configured clamp ring about the cylindrical detector, within the thimble diameter. The clamp ring perimeter may be circular in other embodiments.

A pair of pivot support members 30A and 30AA extend from the outer perimeter sides of split clamp ring portion 18A, with similar pivot shaft support members 30B and 30BB extending from the opposed sides of clamp ring portion 18B. Aperture 32 in pivot shaft support member 30BB accepts pivot shaft member 34, with a pair of support arms 36B and 36BB pivotally mounted from the extending ends of pivot shaft member 34 and extending generally outwardly from the split clamp ring. A second aperture 38 is provided near the extending ends 40 of the support arms 36B-36BB with second pivot shaft member 42 mounted in the aperture 38 in the extending ends of the support arms. An insulated roller member 44 is pivotally mounted between the support arms 36B-36BB about the pivot shaft 42. This insulating roller member comprises a low friction thimble contact means, typically a ceramic roller member which engages the inside surface 46 of the thimble and facilitates movement of the detector assembly and plurality of seismic restraint means in and out of the thimble. A spring bias means 48 is mounted on each extending end of the pivot shaft 34 outside the support arm 36A, with one end 50 of the spring bias means 48 fastened to the support arm 36B at an intermediate support arm portion 52. The other end 54 of the spring bias means extends toward and engages the split clamp ring 18B, so that the support arms are biased outwardly towards the thimble to securely mount the seismic restraint assembly and the detector within the thimble. The spring bias means 48 comprise torsion springs which are wound about the extending ends of the shaft 34 and serve to bias each support arm outwardly so that the contact means engages the thimble with a constant predetermined force which minimizes the seismic vibration acting on the radiation detector. An identical pivot shaft support member, support arms and bias spring means are provided at the four perimeter surfaces of the assembled split clamp ring square perimeter surface. The four low friction thimble contact means at the end of the extending support arms constituting a four point contact system for the restraint means and detector to the interior of the thimble.

A plurality of similar seismic restraint means similar to 16A and 16B are spaced along the length of the detector 12 within the thimble 10. By way of example about five such seismic restraint means each identical to means 16A engage the detector, which can be for example about 12 feet long, with the seismic restraint means being symmetrically spaced along the length of the detector. Also by way of example, each such spring bias means 48 provides a spring force of about 11.5 pounds acting on the support arm.

Figure 4:
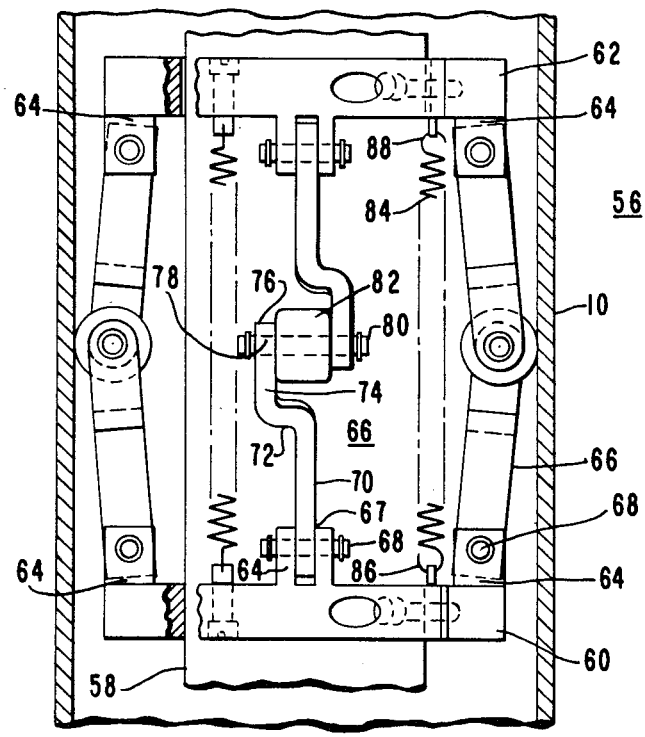
FIG. 4 is a side elevational view partly in section of an alternate embodiment seismic restraint means.

In another embodiment of the invention seen in FIG. 4, a plurality of seismic restraint means 56 are spaced longitudinally along the elongated ion chamber radiation detector 58. The seismic restraint means 56, only one of which is seen in FIG. 4, comprises a first split clamp ring 60 and a second split clamp ring 62 which are longitudinally spaced apart. Each of the split clamp rings 60 and 62 comprises a pair of semi-circular members having an arcuate inside surface which slightly exceeds the detector diameter, with fastening means for connecting together the semi-circular members. One of the clamp rings engages the detector while the other is slidable along the detector. These split clamp rings 60 and 62 are similar to the split clamp ring structure of the embodiment seen in FIGS. 2 and 3, except with an arcuate perimeter rather than a square perimeter.

A plurality of apertured bifurcated pivot shaft support members 64 extend from the perimeter portions of the split slamp rings 60 and 62. The pivot shaft support members 64 from split clamp ring 60 extends toward the other spaced split clamp ring 62, and the pivot shaft support members 64 from ring 62 extend toward ring 60. The pivot shaft support members 64 are symmetrically spaced about the clamp rings 60 and 62 and are aligned, with four such members 64 provided from each clamp ring 60, 62.

A support arm 66 is pivotally connected at one end 67 from each bifurcated pivot shaft support member 64 and the pivot shaft member 68 which passes through apertures provided in each of the bifurcations of support member 64 and the support arm 66. The support arms 66 comprise a first longitudinally extending portion 70 which extends from the pivotally connected end 67, a radially extending portion 72, and a second longitudinally extending portion 74 which is offset longitudinally from the first extending portion 70. The extending ends 76 of support arms 66 have apertures 78 therethrough to permit pivotal connection via shaft 80 to the pair of support arms 66 which extend toward each other from the spaced apart first and second split clamp rings 60, 62. An insulating thimble contact means 82 is mounted on shaft 80 between the extending ends 76 of the support arms. The insulating thimble contact means 82 comprises a ceramic roller as was described for the embodiment of FIG. 2. A plurality of spring bias means 84 are connected at their opposed ends 86, 88 to the spaced-apart clamp rings 60, 62, so as to bias these clamp rings toward each other forcing the support arms outwardly. The spring bias means 84 are preferably a plurality of symmetrically spaced coiled extension springs. The insulating ceramic roller thimble contact means 82 engages the thimble with a predetermined force which minimizes seismic vibration acting on the radiation detector which is secured to the split clamp rings. A plurality of such seismic restraint means 56 are spaced along the elongated length of the ion chamber radiation detector.

We claim:

1. In combination, an elongated tubular thimble adapted to be vertically disposed about a nuclear reactor vessel, a generally cylindrical nulcear radiation detector diposed within the tubular thimble, and seismic restraint means comprising a split clamp ring which is securably connectable about the generally cylindrical radiation detector with a plurality of symmetrically spaced support means pivotally mounted from and extending outwardly from the split clamp ring, with low friction thimble contact means disposed at the extending end of each support means, and wherein spring bias means are coupled to each respective pivotally mounted support means, biasing each means radially outwardly so that the contact means engage the thimble with a constant predetermined force which minimizes seismic vibration acting on the radiation detector.

2. The combination set forth in claim 1, wherein a plurality of seismic restraint means are connected about and spaced along the length of the generally cylindrical radiation detector.

3. Seismic restraint means for mounting a generally cylindrical, elongated, nuclear radiation detector within a tubular thimble comprising: first and second split clamp rings which are spaced apart along the longitudinal length of the elongated detector, which split clamp rings are securably connectable about the generally cylindrical, elongated, radiation detector, with a plurality of symmetrically spaced support means pivotally mounted from and extending outwardly from each of the split clamp rings toward the other split clamp ring, which support means extending from respective split clamp rings are pivotally connected at their extending ends with an insulating roller member thimble contact means disposed over such pivotal connection, and spring bias means comprising a plurality of symmetrically spaced extension springs each connected at opposite spring ends to the spaced-apart first and second split clamp rings to bias together the first and second split clamp rings, so that said thimble contact means engages the thimble with a constant predetermined force which minimizes seismic vibration acting on the radiation detector.

* * * * *